United States Patent [19]
Sykes et al.

[11] 3,903,928
[45] Sept. 9, 1975

[54] VEHICLE EXHAUST TUBING

[75] Inventors: William Fillans Sykes, Gerrards Cross; Anthony Joseph Weeden, Marlow; Ian Martin Cleare, High Wycombe, all of England

[73] Assignee: Smiths Industries Limited, London, England

[22] Filed: Aug. 15, 1973

[21] Appl. No.: 388,712

[30] Foreign Application Priority Data
Aug. 15, 1972 United Kingdom............. 37990/72

[52] U.S. Cl. ............... 138/109; 138/112; 138/149; 181/36 B; 285/47; 285/177; 285/DIG. 4
[51] Int. Cl.² .... F16L 9/06; F16L 9/14; F16L 11/12
[58] Field of Search .......... 138/136, 149, 109, 121, 138/122, 164, 163, DIG. 8; 180/64 A; 181/36 B, 42; 285/47, 177, DIG. 4

[56] References Cited
UNITED STATES PATENTS

| | | | |
|---|---|---|---|
| 1,613,725 | 1/1927 | Sabin | 138/149 X |
| 1,778,040 | 10/1930 | Rutherford | 138/118 |
| 1,995,446 | 3/1935 | Blake | 138/128 |
| 2,583,366 | 1/1952 | Engels | 181/42 |
| 2,718,273 | 9/1955 | Dehaus | 181/42 |
| 2,805,730 | 9/1957 | Applegate | 181/42 |
| 3,058,861 | 10/1962 | Rutter | 138/149 X |

*Primary Examiner*—Donald O. Woodiel
*Assistant Examiner*—Daniel M. Yasich
*Attorney, Agent, or Firm*—Elliott I. Pollock

[57] ABSTRACT

There is disclosed a tubing which is suitable for use as an exhaust and which comprises spaced inner and outer metal tubes and a layer of sound absorbing material disposed between the metal tubes. The tubes are transversely corrugated to facilitate bending of the tubing, the inner tube is perforated, and the outer tube is substantially gastight and has characteristics which enable it to retain a bent shape. Such tubing will give the necessary sound absorption characteristics required for a motor vehicle exhaust and thus obviate the necessity of using the conventional silencer.

9 Claims, 10 Drawing Figures

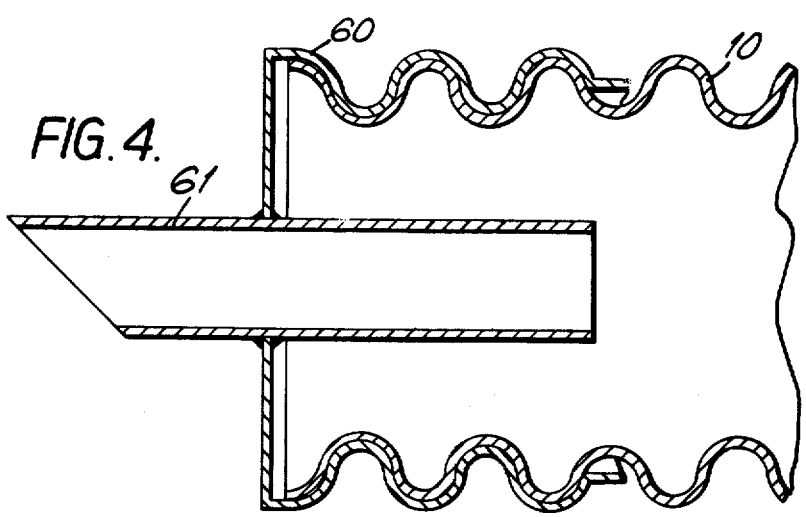
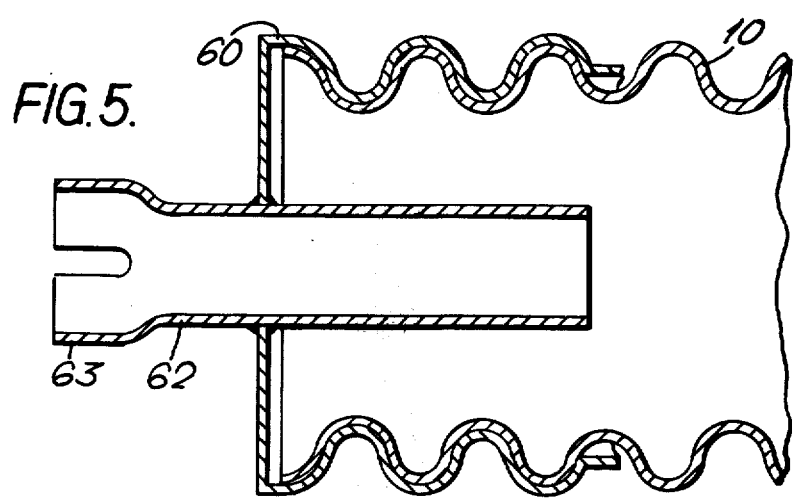
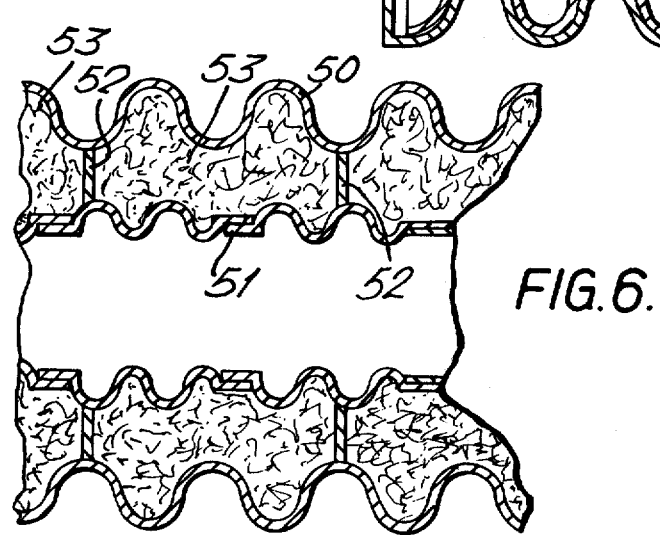

VEHICLE EXHAUST TUBING

This invention relates to tubing.

According to one aspect of the present invention there is provided tubing comprising inner and outer tubular metal members which are concentric with one another and a layer of sound absorbing material between the tubular members, and wherein the tubular members are transversely corrugated to facilitate bending of the tubing, the inner metal member is perforated, and the outer tubular member is substantially gas-tight and has characteristics which enable it to retain a bent shape.

The layer of sound absorbing material may be of tubular form.

The sound absorbing material may be fibrous and, in such a case, may be of mineral wool, glass fibre or metal wool.

At least one of the tubular members may be formed by helically winding metal strip with adjacent turns overlapping one another.

Preferably at least one metal spacer extends between the inner and outer tubular members to maintain the tubular members concentric with one another when the tubing is bent.

According to a further aspect of the present invention there is provided an exhaust for a motor vehicle wherein at least a major part of the length of the exhaust is constituted by tubing as aforesaid.

The area between the tubular members at each end of the tubing may be closed by a respective end fitting.

According to a still further feature of the present invention there is provided a motor vehicle having an exhaust as specified in the said further aspect of the present invention.

Tubing in accordance with the present invention and for use in an exhaust of a motor vehicle will now be described, by way of example, with reference to the accompanying drawings in which:

FIG. 4 is a sectional side view of one end of the tubing with an end fitting thereon;

FIG. 5 is a sectional side view of the other end of the tubing with an end fitting thereon; and FIG. 6 is a sectional side view of an alternative form of the tubing having the inner tube of FIG. 3.

Figure 1:
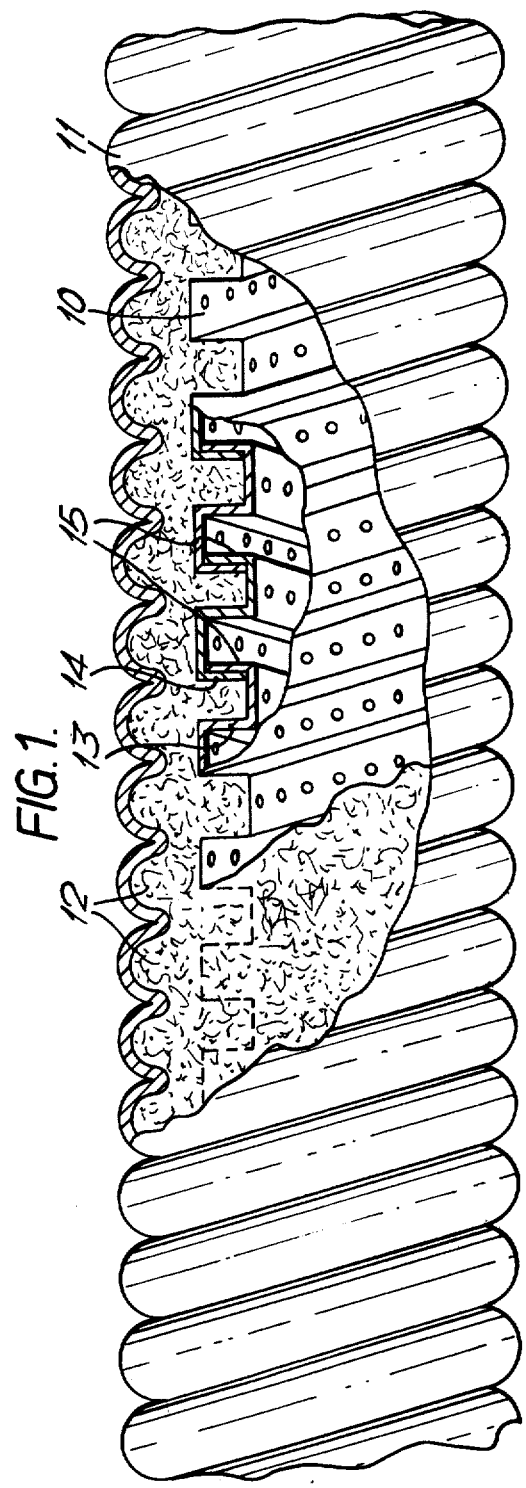
FIG. 1 is a part-sectional side view of one form of the tubing.

Referring to FIG. 1, the tubing comprises a transversely corrugated inner tube 10 of mild steel, a transversely corrugated outer tube 11 of lead-coated, mild steel, and a tube 12 of sound absorbing material sandwiched between the inner and outer metal tubes 10 and 11. The inner tube 10 is perforated. The sound absorbing material is conveniently of a fibrous material such as compressed mineral wool, glass fibre or metal wool.

The metal tubes 10 and 11 are both formed by helically winding metal strip. More particularly, the inner tube 10 is formed from a metal strip of mild steel which is fed between appropriately profiled rollers which deform the mild steel strip to provide a continuous step 13 extending longitudinally of the strip and oppositely directed flanges 14 and 15 on the edges of the strip. The step 13 is formed midway across the width of the strip and the directions of the flanges 14 and 15 are such that in cross-section one half of the strip is of U-shape and the other half of the strip is of inverted U-shape. Prior to this profiling of the metal strip, the strip is passed through a reciprocating punch which forms two parallel rows of holes in the strip, these rows being so positioned that one row of holes will be located in the base of the U-shaped half of the strip and the other row of holes will be located in the base of the inverted U-shaped half of the strip. The profiled strip is formed into a tube by helically winding the metal strip onto a mandrel so that adjacent turns of the tube overlap one another by less than half the width of the profiled strip. Thus for each turn of the so-formed tubing, the inwardly directed flange 14 and the step 13 have disposed therebetween (as shown in FIG. 1) the outwardly directed flange 15 of one adjacent turn of the tube, and the outwardly directed flange 15 and the step 13 have disposed therebetween the inwardly directed flange 14 of the other adjacent turn of the tube.

Figure 2:
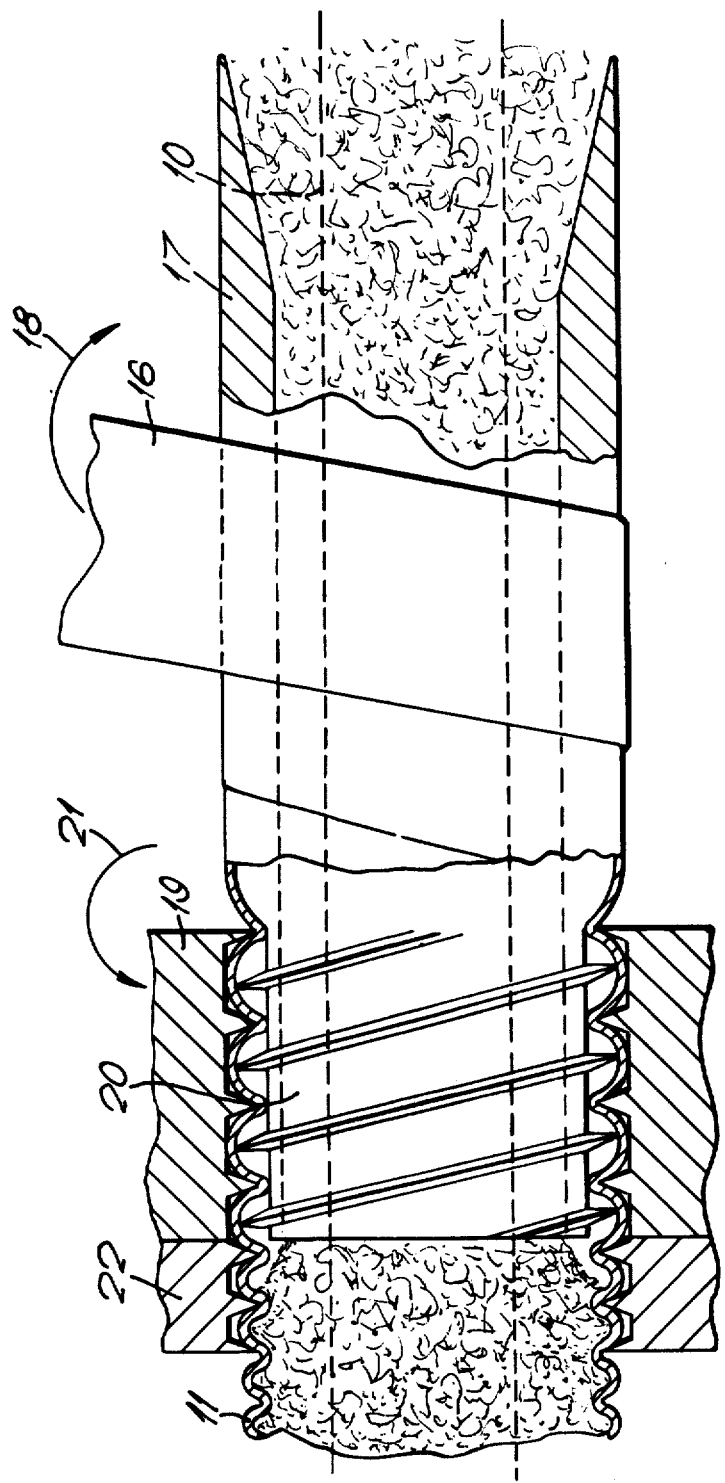
FIG. 2 is a diagrammatic part-sectional side view of a machine for making an outer tube of the tubing and for assembling this tube on to the other parts of the tubing.

Referring to FIG. 2, the outer tube 11 is formed from a metal strip 16 comprising a double layer of lead-coated, mild steel. This strip 16 is helically wound on to a mandrel 17 (in the direction of an arrow 18) with adjacent turns of the strip 16 overlapping one another by slightly less than half the width of the strip 16. The so formed tube is then fed between an outer former 19 and an inner former 20 (constituted by the mandrel 17) having cooperating threads. The formers 19 and 20 are rotated together in the direction of an arrow 21 to form helical corrugations on the tube of opposite hand to that of the helically wound strip material. The tube is thereafter passed through a second outer former 22 which rotates with the former 19 and has a thread which engages the tube to reduce the pitch of the helical corrugations. The machine also includes a snubber device (not shown) which acts on the corrugated tube as it issues from the former 22 to reduce the likelihood of twisting of the tube.

The machine of FIG. 2, in addition to forming the outer tube 11, is also used to assemble the tube 11 on the metal tube 10 and the tube 12 of sound absorbing material. This is achieved by, for example, helically winding the sound absorbing material in strip form on to the tube 10 so that the adjacent turns of the sound absorbing material abut one another and thereafter feeding the so formed tubing assembly through a hole formed in the mandrel 17. As the outer tube 11 issues from the machine it engages the tubing assembly and acts to draw that tubing assembly through the mandrel 17 at a rate equal to the rate at which the outer tube 11 is being delivered by the machine.

It is desirable that the sound absorbing material should be compressed so as to improve the sound absorption characteristic of the material. To this end, the sound absorbing material is wound on to the inner tube 10 under tension. Furthermore, the upstream end of the hole in the mandrel 17 is tapered inwardly so as further to compress the sound absorbing and thereby offset the expansion of the sound absorbing material which takes place when it issues from the mandrel 17.

It has been found that the tubing of FIG. 1 is suitable for use as an exhaust of a motor vehicle. In use the sound waves generated in the inner metal tube pass through the holes in the inner tube 10 into the sound absorbing material 12 and are attenuated by the sound absorbing material. It has been found that such an exhaust will give the necessary sound absorption characteristic required of a motor vehicle exhaust and that it is therefore no longer necessary to use the conventional and rather expensive silencer. Furthermore the tubing is sufficiently pliable to enable the tubing to be bent by hand and may therefore readily be bent at the time of fitting to conform to the shape required to fit the motor vehicle. The outer tube 11 is arranged so that it will enable the tubing to retain its bent shape. Furthermore, the depth, shape and spacing of the corrugations in the outer tube 11 are selected in accordance with the diameter and wall thickness of that tube to ensure that the tube may be bent beyond its elastic limit without kinking.

It is visualized that different diameters of tubing in accordance with the present invention will be required to fit different models and types of motor vehicles. To accommodate this it is proposed to supply drums of the different diameters of tubing required so that, for example, a garage mechanic may replace any motor vehicle exhaust by merely selecting the drum carrying the required diameter of tubing, cutting off the appropriate length of tubing, and thereafter bending the tubing by hand to fit the motor vehicle.

The sound absorbing material is selected from a range of sound absorbing materials which are capable of withstanding the high temperatures and pressure waves which will occur during use of the tubing as an exhaust.

The outer tube may be simply of mild steel instead of lead coated mild steel. Furthermore, it is visualized that the inner and outer tubes may be of galvanized or stainless steel strip. The outer metal tube may also be formed from a single layer metal strip.

The metal strip 16 (FIG. 2) used to form the outer tube 11 may be coated on one side with a layer of thermosetting adhesive which is arranged to cure at the operating temperature of the exhaust. This adhesive on setting improves the gas-tight seal between the turns of the outer tube and also the rigidity of the outer tube and hence of the tubing.

It is necessary to close the annular space between the inner and outer tubes 10 and 11 at each end of the cut length of exhaust tubing. This is achieved by means of cup-shaped, end fittings which are screw threaded to mate with the corrugations on one of the metal tubes 10 and 11. The end fitting at the downstream end of the exhaust is shown in FIG. 4 and comprises a cup-shaped metal member 60 having a screw-threaded which cooperates with the corrugations on the motor tube 11, the member 60 carrying a tube 61 which extends from the end of the exhaust. This extension of the tube 61 is chrome plated.

In one form of the present invention the tubing is used to form the complete length of the exhaust. However, it is visualized that in certain motor vehicles the length of the exhaust pipe immediately adjacent to the engine would be retained. In these circumstances the end fitting at the upstream end of the tubing, which is shown in FIG. 5, is provided with a tubular extension 62 to embrace the downstream end of that pipe to facilitate fixing of the end fitting onto the pipe by means of an annular clamp which surrounds an enlarged-diameter portion 63 of the tubular extension 62.

Various other forms of gas-tight tube may be provided to constitute the outer tube 11. For example, the tube may be a welded tube and, in such a case, the corrugations may be formed in the metal strip before it is bent to form the tube or after the welded tube has been formed.

Figure 3A:
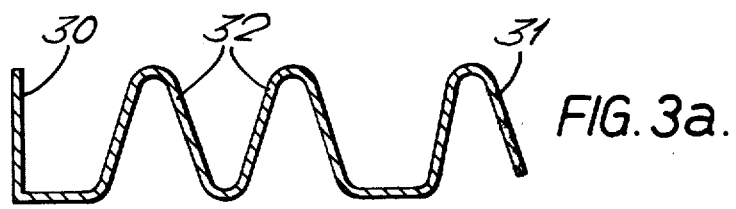
FIG. 3 shows a series of diagrams used to illustrate a method of forming an alternative form of inner metal tube for the tubing.

Similarly, other forms of inner tube 10 may be used. For example, the tube 10 may be formed by the method schematically shown in FIG. 3. Referring to FIG. 3, the metal strip is firstly perforated by feeding it through a reciprocating punch and is thereafter fed between a pair of profiling rollers to form, as shown in FIG. 3a, an upstanding flange 30 on the edge of the strip, an inverted generally U-shaped portion 31 on the other edge, and a plurality of corrugations 32 which are disposed intermediate the flange 30 and the portion 31 and which extend longitudinally of the strip. The profiled strip is helically wound on a mandrel (FIG. 3b) so that the upstanding flange 30 on each turn of the strip extends into the U-shaped portion 30 of an adjacent turn and this flange 30 is then engaged by a forming tool or roller which folds over the portion 31 and the flange 30 so as partially to form a seam between adjacent turns of the tube (FIG. 3c. This seam is completed (FIG. 3d) by crimping the portion 31 to the flange 30 using a roller.

It is visualized that the tubing may include at least one metal spacer which extends between the inner and outer tubes 10 and 11 to maintain these tubes concentric when the tubing is bent.

For example, the form of the tubing including a corrugated, welded outer tube and a corrugated inner tube as described with reference to FIG. 3, may include one or more metal spacers which extend between the inner and outer tubes of the tubing. Such a form of the tubing is shown in FIG. 6 where the outer tube is referenced 50 and the inner tube is referenced 51. In this tubing there is provided a plurality of metal rings 52 disposed at spaced locations along the length of the tubing and the sound absorbing material is provided by tubular lengths 53 of the sound absorbing material disposed between the metal rings 52.

Figure 3B:
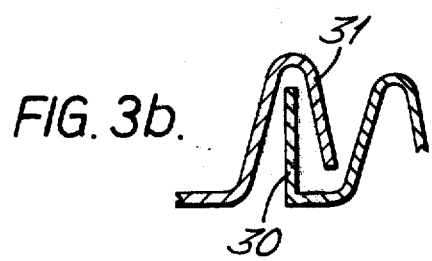
Figure 3C:
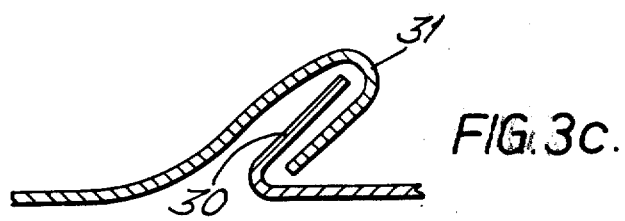
Figure 3D:
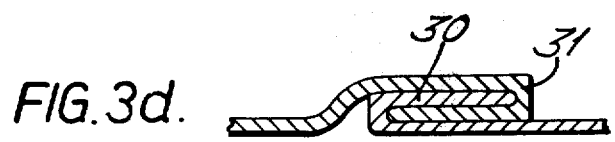
Figure 3E:
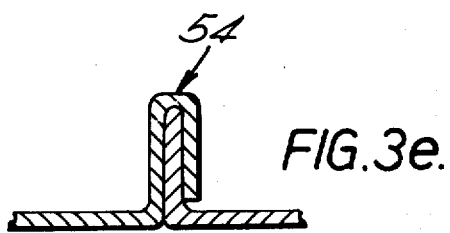

In an alternative arrangement the rings 52 are replaced by a single helical rib formed on the inner tube 51. This is achieved by passing the inner tube 51, as shown in FIG. 3b, between a pair of forming tools or rollers which act on the U-shaped portion 32 to compress it as shown in FIG. 3e to form an outwardly extending helical rib 54. In such a case, the sound absorbing material is in the form of a strip and is helically wound on the inner tube in the helical groove bounded by the rib 54.

We claim:

1. An exhaust pipe for a motor vehicle wherein at least a major part of the length of the exhaust pipe is constituted by tubing which is capable of being bent and retaining a bent shape and which comprises spaced inner and outer tubular members which are concentric with one another, a layer of compressed sound-absorbing material filling the volume between the spaced tubular members, each of said tubular members being corrugated to facilitate said bending of the tubing, the corrugations extending completely around the respective tubular member and extending substantially transversely of the of the length of the tubing with the corrugations on at least one of the tubular members being in the form of a helix centered on the longitudinal axis of the tubing, the inner tubular member being perforated for passage of sound waves generated in said inner tubular member into said compressed sound-absorbing material to be attenuated therein, the outer tubular member being substantially gas-tight, and a pair of end fittings mounted on the opposing ends respectively of the tubing, each end fitting comprising a corrugated sleeve portion concentric with said tubular members, the corrugations of said sleeve portion mating with the corrugations of one of said corrugated tubular members, each end fitting including an annular wall integral with said sleeve portion and positioned to extend across the space between said tubular members thereby to close the respective end of the volume between the said spaced tubular members, and each end fitting further including a hollow tubular element communicating with the interior of said inner tubular member and mounted on the said annular wall to extend outwardly from the respective end of the tubing in a direction parallel to the longitudinal axis of the tubing.

2. The exhaust pipe of claim 1 wherein said layer of compressed sound-absorbing material is of tubular form.

3. The exhaust pipe of claim 1 wherein said sound-absorbing material is fibrous.

4. The exhaust pipe of claim 1 wherein at least one of said tubular members is formed of helically wound metal strip having adjacent turns overlapping one another.

5. The exhaust pipe of claim 1 wherein the crests and troughs of the corrugations in the inner tubular member are perforated, the corrugated sleeve portion of each end fitting mating with the corrugations of the outer tubular member, the hollow tubular element of each end fitting extending through its associated annular wall to provide portions of said tubular element on each side of said annular wall.

6. In an exhaust for a motor vehicle wherein at least a major part of the length of the exhaust is constituted by tubing which is capable of being bent and retaining a bent shape and which comprises spaced inner and outer tubular members which are concentric with one another, and a layer of sound-absorbing material filling the volume between the tubular members, each of said tubular members being corrugated transversely of its length to facilitate said bending of the tubing, the inner tubular member being perforated for passage of sound waves generated in said inner tubular member into said sound-absorbing material to be attenuated therein, and the outer tubular member being substantially gas-tight, the improvement comprising end fittings mounted to mate with respective ends of the tubing, each end fitting comprising means cooperating with the at least the outer portions of the corrugations on said inner tubular member so as to enable the end fitting to be screwed on the inner tubular member of the tubing. a generally annular wall coupled to the said means to close the respective end of the volume between the said tubular members, and a further tubular member mounted through the said annular wall to extend outwardly from the respective end of the tubing in a direction parallel to the longitudinal axis of the tubing.

7. In an exhaust for a motor vehicle wherein at least a major part of the length of the exhaust is constituted by tubing which is capable of being bent and retaining a bent shape and which comprises spaced inner and outer tubular members which are concentric with one another, and a layer of sound-absorbing material filling the volume between the tubular members, each of said tubular members being corrugated transversely of its length to facilitate said bending of the tubing, the inner tubular member being perforated for passage of sound waves generated in said inner tubular member into said sound-absorbing material to be attenuated therein, and the outer tubular member being substantially gas-tight, the improvement comprising end fittings mounted to mate with respective corrugated ends of the tubing, each end fitting including means closing the respective end of the volume between the said tubular members, and a plurality of annular support members disposed between the said tubular members at spaced locations along the length of the tubing, the support members each extending between the inner and outer tubular members and engaging therewith to maintain the tubular members concentric with one another when the tubing is bent.

8. In an exhaust for a motor vehicle wherein at least a major part of the length of the exhaust is constituted by tubing which is capable of being bent and retaining a bent shape and which comprises spaced inner and outer tubular members which are concentric with one another, and a layer of sound-absorbing material filling the volume between the tubular members, each of said tubular members being corrugated transversely of its length to facilitate said bending of the tubing, the inner tubular member being perforated for passage of sound waves generated in said tubular member into said sound-absorbing material to be attenuated therein, and the outer tubular member being substantially gas-tight, the improvement comprising end fittings mounted to mate with respective corrugated ends of the tubing, each end fitting including means closing the respective end of the volume between the said tubular members, and a continuous helical rib formed on one of the tubular members, the rib extending towards and engaging with the other tubular member to maintain the tubular members concentric with one another when the tubing is bent.

9. An exhaust according to claim 8, wherein the said helical rib is formed on the said inner tubular member.

* * * * *